(12) United States Patent
Verbist et al.

(10) Patent No.: US 11,255,166 B2
(45) Date of Patent: Feb. 22, 2022

(54) METHOD OF RESTRAINING MIGRATION OF FORMATION SOLIDS IN A WELLBORE

(71) Applicant: SHELL OIL COMPANY, Houston, TX (US)

(72) Inventors: Guy Lode Magda Maria Verbist, Amsterdam (NL); Gerardus Johannes Leonardus Van Der Wegen, Sittard (NL); Gideon Langedijk, Rijswijk (NL); Erik Kerst Cornelissen, Amsterdam (NL); Peter Jan Bleeker, Rijswijk (NL); James Frank Heathman, Houston, TX (US); Christopher John Mead, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/889,763

(22) Filed: Jun. 1, 2020

(65) Prior Publication Data

US 2020/0291755 A1 Sep. 17, 2020

Related U.S. Application Data

(63) Continuation of application No. PCT/US2018/061206, filed on Nov. 15, 2018.
(Continued)

(30) Foreign Application Priority Data

Dec. 4, 2017 (EP) .................................... 17205157

(51) Int. Cl.
*E21B 43/02* (2006.01)
*C09K 8/57* (2006.01)
(Continued)

(52) U.S. Cl.
CPC ............. *E21B 43/025* (2013.01); *C09K 8/572* (2013.01); *E21B 43/082* (2013.01); *C04B 7/51* (2013.01); *C04B 7/52* (2013.01)

(58) Field of Classification Search
CPC .......... E21B 43/02; E21B 43/04; E21B 43/08; E21B 43/10
See application file for complete search history.

(56) References Cited

U.S. PATENT DOCUMENTS

| 3,119,448 A | 1/1964 | Rhoades et al. |
| 3,244,229 A | 4/1966 | Hujsak et al. |

(Continued)

FOREIGN PATENT DOCUMENTS

| EP | 1925651 A1 | 5/2008 |
| GB | 953991 A | 4/1964 |
| WO | 0187797 A1 | 11/2001 |

OTHER PUBLICATIONS

International Search Report and Written Opinion received for PCT Patent Application No. PCT/US2018/061206, dated Jan. 18, 2019, 09 pages.

(Continued)

*Primary Examiner* — Andrew Sue-Ako
(74) *Attorney, Agent, or Firm* — Shell Oil Company

(57) ABSTRACT

Migration of formation solids in a wellbore is restrained by feeding a slurry, comprising water, a viscosifier, and a concentration of cement clinker particles, into the wellbore, and hydrating the clinker particles in the wellbore. The clinker particles are kept in suspension during the hydrating, and upon completion of the hydrating the hydrated clinker particles form a hardened cement consisting of a permeable structure of interconnected hydrated clinker particles. A layer of degradable lost circulation material (LCM) may be employed to separate the slurry with clinker particles from (Continued)

the formation surrounding the wellbore during hydrating of the clinker particles.

20 Claims, 1 Drawing Sheet

Related U.S. Application Data

(60) Provisional application No. 62/734,311, filed on Sep. 21, 2018.

(51) Int. Cl.
*E21B 43/08* (2006.01)
*C04B 7/51* (2006.01)
*C04B 7/52* (2006.01)

(56) References Cited

U.S. PATENT DOCUMENTS

| | | | |
|---|---|---|---|
| 3,768,557 A * | 10/1973 | Spurlock | E21B 43/04 166/228 |
| 5,504,062 A * | 4/1996 | Johnson | C09K 8/08 507/212 |
| 6,263,987 B1 | 7/2001 | Vail, III | |
| 6,397,946 B1 | 6/2002 | Vail, III | |
| 2003/0224165 A1 | 12/2003 | Anderson et al. | |
| 2005/0019574 A1 | 1/2005 | McCrary | |
| 2007/0036977 A1 | 2/2007 | Sinclair et al. | |
| 2013/0341024 A1 | 12/2013 | Fonseca et al. | |
| 2015/0321953 A1 * | 11/2015 | Porcherie | C04B 14/04 166/293 |
| 2015/0337620 A1 | 11/2015 | Fonseca Ocampos et al. | |
| 2016/0280990 A1 | 9/2016 | Lieng et al. | |
| 2016/0341022 A1 | 11/2016 | Fonseca Ocampos | |
| 2018/0142539 A1 | 5/2018 | Hurst et al. | |

OTHER PUBLICATIONS

Singh et al., "Development of an Acid Degradable Drill-In Fluid for Fractured Reservoirs", Society of Petroleum Engineers, SPE38153, 1997, SPE European Formation Damage Conference, Jun. 2-3, 19 pages.
Savari et al., "Lost Circulation Management in Naturally Fractured Reservoirs", SPE/IADC-178165, PE/IADC Middle East Drilling Technology Conference and Exhibition, Jan. 2016, 7 pages.
Nana et al., "Successful Application of Self-Degradable Lost Circulation Control Pill in Managed Pressure Drilling for a Deepwater Well", Society of Petroleum Engineers, IADC/SPE-180571-MS, IADC/SPE Asia Pacific Drilling Technology Conference, 22-24, Aug. 2016, 8 pages.
Luzardo et al., "Alternative Lost Circulation Material for Depleted Reservoirs", OTC-26188-MS, Jan. 2015, 20 pages.
Cook et al., "Stabilizing the Wellbore to Prevent Lost Circulation", Oilfield Review Winter, vol. 23, Issue No. 4, 2011-2012, pp. 26-35.

* cited by examiner

METHOD OF RESTRAINING MIGRATION OF FORMATION SOLIDS IN A WELLBORE

CROSS REFERENCE TO RELATED APPLICATIONS

The present application is a Continuation application of co-pending International Application No. PCT/US2018/061206, filed 15 Nov. 2018, which claims priority of European patent application No. 17205157.5, filed 4 Dec. 2017 and U.S. provisional application No. 62/734,311 filed 21 Sep. 2018.

FIELD OF THE INVENTION

In one aspect, the present invention relates to a method of restraining migration of formation solids in a wellbore.

BACKGROUND OF THE INVENTION

Producing formation fluids using a wellbore may cause migration of formation solids, and release of these solids into the wellbore. A well-known example is sand which is co-produced with the formation fluids. Another cause of solids migration may be water contact with formation clay, which may result in release of clay particles and/or other solids into the wellbore. Such phenomena may compromise the structural integrity of the wellbore and/or severely restrict production. Several treatment strategies have been developed in the industry to control migration of formation solids, including sand consolidation interventions, gravel packing and sand screens.

U.S. Pat. No. 3,244,229 describes a method for production of fluids from an unconsolidated formation, wherein a permeable rigid filter is created using ground hydraulic cement clinker prepared from calcium silicate, high alumina cement, or calcium aluminate. The ground material is introduced into the wellbore in dry form, and hydrated in the wellbore by contact with formation water which is ordinarily standing in the wellbore. The clinker particles bond to one another at points of contact, whereby a rigid filter is formed which prevents sand from entering the well while at the same time permitting fluids to be produced in normal fashion. However, it is believed that permeability may be lost after a prolonged amount of time, as the porosity in a packed structure is removed after full hydration of the clinker.

SUMMARY OF THE INVENTION

The invention provides a method of restraining migration of formation solids in a wellbore, comprising:
  feeding a slurry, comprising water, a viscosifier, and a concentration of cement clinker particles, into the wellbore;
  hydrating the clinker particles in the wellbore, whereby the clinker particles are kept in suspension during the hydrating and whereby upon completion of the hydrating the hydrated clinker particles form a hardened cement consisting of a permeable structure of interconnected hydrated clinker particles.

BRIEF DESCRIPTION OF THE DRAWING

The appended drawing, which is non-limiting, comprises the following figures.

DETAILED DESCRIPTION OF THE INVENTION

Figure 4:
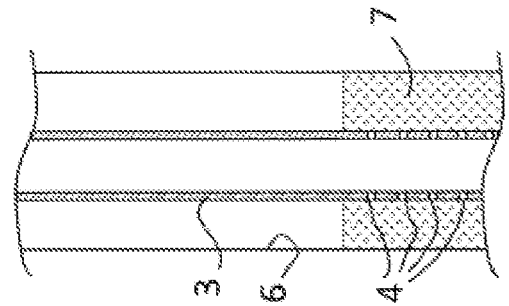
FIG. 4 schematically shows the wellbore after drilling out.

The invention will be further illustrated hereinafter by way of example only, and with reference to the non-limiting drawing. The person skilled in the art will readily understand that, while the invention is illustrated making reference to one or more specific combinations of features and measures, many of those features and measures are functionally independent from other features and measures such that they can be equally or similarly applied independently in other embodiments or combinations.

The presently proposed method of restraining migration of formation solids in a wellbore comprises hydrating clinker particles in the wellbore, whereby the clinker particles are kept in suspension during the hydrating. Upon completion of the hydrating the hydrated clinker particles form a hardened cement consisting of a permeable structure of interconnected hydrated clinker particles.

As the cement clinker particles are kept in suspension during the hydration, it is possible to control the permeability of the hardened structure better. Generally, the solid volume of cement clinker particles increases by about a factor of two during the hydration reaction with water. Packing of unhydrated clinker particles is avoided by hydrating the clinker particles while in suspension, thus allowing the clinker particles to swell before they come in direct contact with neighboring clinker particles. This generally leaves more room between the hydrated clinker particles for leaving controlled permeability.

The term "permeable structure" in the context of the present description means that hydrocarbon fluids can pass from the formation through the structure to be produced at surface. The permeability should generally not be lower than about 1 milliDarcy (mD) when measured using API RP 27, American Petroleum institute, Dallas, 1956 (API Recommended Practice for Determining Permeability of Porous Media). In certain embodiments, the permeability is not lower than 10 mD. In certain embodiments, the permeability is not lower than 50 mD.

The permeability can be very high, up to as high as 60 D. However, the effectiveness at restraining solids migration in the wellbore will be compromised with increasing permeability. In some wellbores, the permeability is limited at at 10 D. In one group of embodiments, the permeability is in a range of from 0.8 D to 8 D. In another group of embodiments, the permeability may be in the range of from 10 mD to 10 D. In another group of embodiments, the permeability may be in the range of from 50 mD to 10 D. In another group of embodiments, the permeability may be in the range of from 10 mD to 500 mD. In still another group of embodiments, the permeability may be in the range of from 50 mD to 500 mD.

It is expected that the controlled permeability is sustainably retained over time, as the clinker particles were in less-than-packed density prior to their hydration.

Raw clinker, sometimes also referred to as coarse cement grain, can be obtained as an intermediate from the cement industry that has hydraulic capability but is not yet fully ground to cement dust. The raw clinker may be converted for use in the described method in a number of different ways. For example, raw clinker can be passed through a coarse grinder and/or screened to provide the desired particle size distribution. Untreated ground and screened clinker particles are already suitable for creating the slurry of the method as described herein, and no further treatment may be necessary. However, optionally chemical or physical modifiers may be applied to the untreated clinker particles if desired, to optimize one or more properties.

The cement clinker particles are kept in suspension in a slurry, which, in addition to the cement clinker particles, also contains water and a viscosifier. The slurry is a water-based gel. The space in between the coarse cement particles must be so large that after the hydration reaction enough room is left to create a permeable matrix. In some embodiments, the viscosifier does not bond with the permeable matrix. This allows the viscosifier to be washed out of the resulting permeable cement clinker structure after setting.

Typically, the cement clinker particles should be (much) coarser than cement powder particulates used in normal wellbore cementing applications, in order to achieve a substantially permeable structure. For example, the particle size distribution may be such that at least about 95% of the cement clinker particles are retained by sieve mesh No. 140. However, under limit of the particle size distribution may be limited to somewhat larger particles. For example, at least about 95% of the cement clinker particles may be retained by mesh No. 100. In another example, at least about 95% of the cement clinker particles may be retained by mesh No. 70. In certain embodiments, the clinker particles are selected such that at least about 95% of the cement clinker particles are retained by sieve mesh No. 50.

The large-particle limit of the particle size distribution is typically governed by inability to stay in suspension. Other considerations for selecting the largest particle size include:
 the setting time (this can be defined as time up to reaching initial strength, or time needed to fully hydrate the cement clinker particles. The qualifier "fully", in this context, means that the hydration rate has become zero or very close to zero on the time scale of months. It may be that less than 100% of the particle mass will eventually hydrate); and/or
 mechanical integrity (compressive strength) of the resulting permeable structure.

If the coarse cement particle size is reduced the permeability will be reduced, the setting time reduced and the compressive strength increased. If, on the other hand the coarse cement particle size is increased, the permeability is increased but the compressive strength is reduced and the setting time increased.

As general indication it is suggested that at least 95% of the cement clinker particles can pass though sieve mesh No. 5. However, smaller screen sizes may be selected in order to retain more freedom to optimize the amount of viscosifier in the slurry composition. In certain examples, at least 95% of the cement clinker particles can pass through mesh No. 10. In other examples, at least 95% of the cement clinker particles can pass through mesh No. 40.

The optimal ratio by volume of cement clinker particles to water in the slurry composition depends mainly on clinker particle size distribution (given by, for example, screening sizes). There is a minimum cement to water ratio below which the cement will not set, because the clinker particles will not grow together, or remain in a clay-like state when the cement particles will only partially grow together. However, increasing cement/water ratios may reduce the porosity and permeability of the resulting structure. The ratio may be selected such that after hydration the hydrated cement clinker particles touch neighboring cement clinker particles sufficiently to create a robust structure while leaving sufficient inter-particle space to provide the desired permeability. Typically, larger particles require a higher volume ratio of cement clinker particles to water, as volume increase of larger particles is relatively less than with smaller particles. The optimal ratio is usually found somewhere 1:2.5 and 1:4.0.

Additional considerations for selecting a suitable viscosifier include viscosity and yield point of the slurry. These may be kept low enough to make the slurry pumpable. The viscosity (and yield point) may also be low enough to be able to feed the slurry into the wellbore without fracturing the formation rocks that surround the wellbore. However, lower yield points will also make it less likely for the cement clinker particles to suspend, which severely reduces the ability to control the porosity and permeability of the final structure. On the other hand, a high yield will create a risk that the cement will not set, and the slurry might also not be pumpable.

The type and amount of viscosifier in the slurry composition is therefore of relevance to control such properties. In the range of typical available viscosifiers, including weak ones, generally the concentration of viscosifier in the slurry is less than 20% by mass of water, and for most viscosifiers less than 12%.

Examples of suitable viscosifiers include: bentonite; laponite, xanthan, carrageenan.

When one or more of the viscosifiers mentioned above are employed, the concentration may typically be between 1% and 20%. In the higher end of this range, excess clay may start to form during the hydration of the cement clinker particles, which may be difficult to wash out from the resulting permeable structure. Hence, with clay-based viscosifiers the concentration may be limited by 12%, or by 9%. The lower end of the range may depend on the particle size distribution of the cement clinker particles. As small clinker particles contribute to viscosity of the slurry, the adding of a sufficient concentration of viscosifier allows for screening on larger clinker particle sizes thereby enhancing the permeability of the final structure. Other types of viscosifiers may require less than 2%, or even less than 1%.

Typical slurries that have been obtained using the above considerations, had a cement clinker particle to water volume ratio of 1:2.80 for particles screened at −40 and +70 mesh sizes, which means that about 90% of the particles are by a mesh 40 screen and pass through a mesh 70 screen. These slurries typically had a density in the range of between 1.2 and 1.9 kg/liter.

Figure 1:
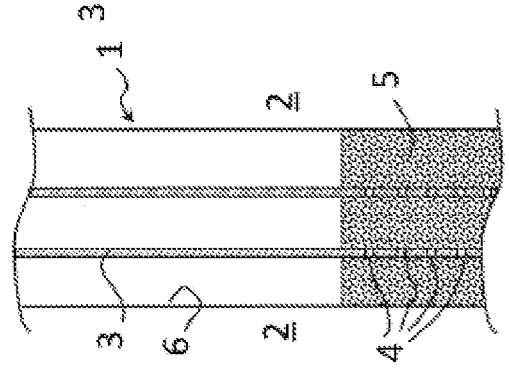
FIG. 1 schematically shows a section of a wellbore into which a slurry has been fed.

FIG. 1 schematically shows a section of a wellbore 1 in an earth formation 2, after feeding a slurry 5 into the wellbore 1. The wellbore 1 in this example comprises a perforated production tube 3 configured in the wellbore 1. An annulus is present between the perforated production tube 3 and a wellbore wall 6.

The wellbore may be a fluid producing wellbore, producing hydrocarbon fluids (oil and/or gas) and/or water from the surrounding formation rocks of the earth formation 2. The produced fluids may enter into the perforated production tube 3 through one or more perforations 4 provided in the tube wall.

The slurry 5 fills up a part of the wellbore 1 adjacent to the perforations 4. The slurry 5 can neatly flow and fill up the annulus between the perforated production tube 3 and a wellbore wall 6. The slurry 5 comprises water, a viscosifier, and a concentration of cement clinker particles. The slurry is a gel, wherein the cement clinker particles are suspended. The slurry 5 may suitably be pumped into the wellbore 1. The slurry may suitably be fed into the wellbore 1 through the perforated production tube 3. The pressure can be kept sufficiently low during the feeding of the slurry into the wellbore 1, to avoid fracturing of the formation rocks surrounding the wellbore 1.

Figure 2:
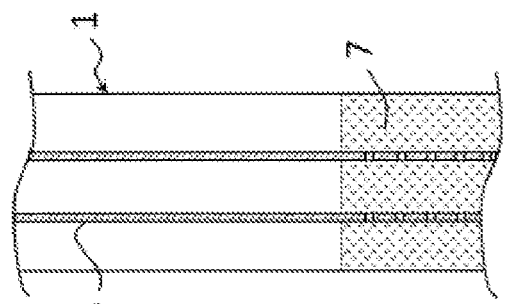
FIG. 2 schematically shows the wellbore of FIG. 1 after hydrating of cement clinker particles.

FIG. 2 shows the wellbore 1 of FIG. 1, after hydrating the clinker particles in the wellbore 1. During hydrating, the clinker particles were kept in suspension. Upon completion of the hydrating, the hydrated clinker particles form a hardened cement consisting of a permeable structure 7 of interconnected hydrated clinker particles.

Figure 3:
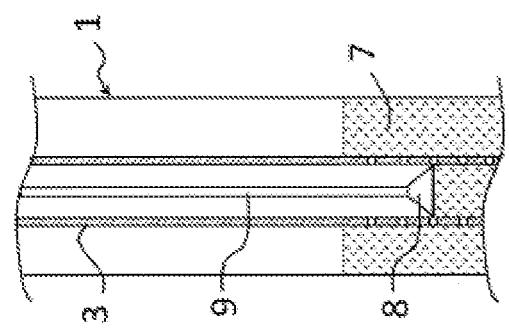
FIG. 3 schematically shows a step of drilling out hardened cement in the wellbore of FIG. 2.

FIG. 3 shows the wellbore 1 of FIG. 2 during a step of drilling out any hardened cement from the perforated production tube 3. This may be performed with a suitable drill bit 8 on a drill string or coiled tubing 9.

FIG. 4 shows the wellbore 1 of FIG. 2 after the step of drilling out has been completed and the drill bit 8 has been removed from the wellbore 1. The hardened cement permeable cement structure is present in the annulus between the perforated production tube 3 and the wellbore wall 6. It allows produced fluids to traverse from the formation rocks through the permeable cement to the perforations and into the perforated production tube 3, while restraining migration of formation solids such as unconsolidated sand or dissolved clay.

In one example tested in the laboratory, a cement slurry was produced using 100 g of cement clinker particles screened at −40 and +70 mesh sizes, 15 g of bentonite and 88 g of water (tap water). The cement clinker particle to water volume ratio was 1:2.80 and the resulting slurry density was 1.80 kg/liter. The permeability after setting was determined to be 0.6 D.

The permeability of the final structure can be further modified by adding a concentration additives that increase the porosity, into the slurry composition, such as a fiber material or cracking agents which can create cracks in the hydrated clinker structure. An example of fiber material suitable for this purpose is aluminum fiber material. Such fiber material should not affect setting time.

A layer of degradable lost circulation material (LCM) may be employed to separate the slurry with clinker particles from the formation surrounding the wellbore during hydrating of the clinker particles. This way, the water/cement ratio of the slurry in the wellbore can be preserved before and during the hydration of the clinker particles. Herewith it is more certain that the clinker particles stay in suspension during the hydration, and that the ultimate permeability of the ultimately obtained permeable structure meets the design requirements.

LCM is commonly added to drilling muds to avoid loss of drilling mud to the formation during drilling operations. After drilling the borehole is then cleaned out to open up the wellbore to allow ingress of formation fluids into the wellbore. In the presently proposed application, the LCM will be trapped behind the permeable cement structure. By selecting a degradable LCM, the LCM can nonetheless disappear after the permeable cement structure has been hydrated and set.

The selected LCM may be soluble in a formation fluid being produced in the wellbore. For example, the degradable LCM may be soluble in formation water being produced in the wellbore. In certain embodiments, the water used to prepare the slurry may already be saturated to avoid dissolution of the LCM by the slurry itself. Once formation water is being produced, the concentration of dissolved LCM in the slurry will become lower due to ingress of formation water, and this will then cause to the LCM present between the permeable structure and the formation to dissolve.

Suitably for the present purpose, the degradable lost circulation material may comprise water-soluble particles. Many LCM materials known for drilling are degradable by acids. However, acids may also dissolve the permeable structure comprising the clinker. Therefore, for the present application water-soluble particles may be preferred. Examples of water-soluble particles include salt crystals, such as Halite, also known as rock salt. In such cases, salt water is used to create the initial clinker slurry. The concentration of salt in the slurry may be enough to fully saturate the slurry water. This will avoid the tendency of the LCM to dissolve in the slurry. Slurries based on saturated salt water (NaCl) have successfully been created and allowed to hydrate to become a permeable structure in the laboratory.

The particle size distribution of the salt crystals (or generally of the LCM particles, even when other materials than salt crystals are used) may be selected such that flow paths into the formation surrounding the wellbore are plugged by the particles, thereby preventing loss of fluid into the formation.

If the wellbore does not already have a suitable degradable LCM, it must first be applied by circulating a fluid containing the right concentration and particle size distribution of LCM particles. In the case of Halite particles, the carrier fluid may be salt-saturated in order to preserve the Halite crystals. Then the clinker slurry may be pumped as described hereinabove.

The person skilled in the art will understand that the present invention can be carried out in many various ways without departing from the scope of the appended claims.

What is claimed is:

1. A method of restraining migration of formation solids in a wellbore surrounded by a formation, comprising:
    feeding a slurry, comprising water, a viscosifier, and a concentration of cement clinker particles, into the wellbore;
    hydrating the clinker particles in the wellbore, whereby the clinker particles are kept in suspension during the hydrating and whereby upon completion of the hydrating the hydrated clinker particles form a hardened cement consisting of a permeable structure of interconnected hydrated clinker particles, wherein a layer of degradable lost circulation material separates the slurry with clinker particles from the formation surrounding the wellbore during said hydrating of the clinker particles, wherein the degradable lost circulation material comprises salt crystals.

2. The method of claim 1, wherein the permeable structure has a permeability of at least 10 mD (milliDarcy).

3. The method of claim 2, wherein the permeability is lower than 10 D.

4. The method of claim 1, wherein the wellbore is a fluid producing wellbore.

5. The method of claim 1, wherein said feeding comprising pumping.

6. The method of claim 1, wherein the wellbore comprises a perforated production tube configured in the wellbore, whereby an annulus is present between the perforated production tube and a wellbore wall, and wherein the slurry is fed into the wellbore through the perforated production tube.

7. The method of claim 6, further comprising drilling out any hardened cement from the perforated production tube.

8. The method of claim 1, further comprising tuning the permeability to within a selected permeability range by selecting a combination of particle size distribution, particle concentration, and viscosity.

9. The method of claim 1, wherein the viscosifier comprises at least one selected from the group consisting of: bentonite, laponite, xanthan, and carrageenan.

10. The method of claim 9, wherein the concentration of viscosifier in the slurry is less than 20% by mass of water.

11. The method of claim 1, wherein the ratio by volume of cement clinker particles to water is in a range of between 1:2.5 and 1:4.0.

12. The method of claim 1, wherein the cement clinker particles have been ground.

13. The method of claim 1, wherein the cement clinker particles have been screened.

14. The method of claim 1, wherein at least about 95% of the cement clinker particles are retained by sieve mesh No. 140.

15. The method of claim 14, wherein at least about 95% of the cement clinker particles can pass though sieve mesh No. 5.

16. The method of claim 1, wherein the degradable lost circulation material is soluble in a formation fluid being produced in the wellbore.

17. The method of claim 1, wherein the degradable lost circulation material is soluble in formation water being produced in the wellbore.

18. The method of claim 1, wherein the water comprised in the slurry is saltwater.

19. The method of claim 18, whereby the concentration of salt in said water fully saturates the water.

20. The method of claim 1, wherein the salt crystals comprise halite.

* * * * *